United States Patent
Mayer et al.

(10) Patent No.: US 12,541,114 B2
(45) Date of Patent: Feb. 3, 2026

(54) MULTI-SENSOR SYSTEM HAVING AN OPTICAL BEAM SPLITTER

(71) Applicant: HOYA CORPORATION, Tokyo (JP)

(72) Inventors: Wolfgang Mayer, Ehingen am Ries (DE); Florian Bauer, Friedberg (DE); Holger Zischke, Munich (DE)

(73) Assignee: HOYA CORPORATION, Tokyo (JP)

( * ) Notice: Subject to any disclaimer, the term of this patent is extended or adjusted under 35 U.S.C. 154(b) by 303 days.

(21) Appl. No.: 18/290,400

(22) PCT Filed: Apr. 27, 2022

(86) PCT No.: PCT/IB2022/053891
§ 371 (c)(1),
(2) Date: Nov. 13, 2023

(87) PCT Pub. No.: WO2022/238800
PCT Pub. Date: Nov. 17, 2022

(65) Prior Publication Data
US 2024/0248318 A1     Jul. 25, 2024

(30) Foreign Application Priority Data
May 14, 2021   (DE) ...................... 10 2021 112 575.8

(51) Int. Cl.
*G02B 27/10*     (2006.01)
*G02B 23/24*     (2006.01)

(52) U.S. Cl.
CPC ..... *G02B 27/1013* (2013.01); *G02B 23/2453* (2013.01)

(58) Field of Classification Search
CPC .......................... G02B 27/1013; G02B 23/2453
(Continued)

(56) References Cited

U.S. PATENT DOCUMENTS

2010/0165080 A1   7/2010   Yamaguchi et al.
2013/0286175 A1   10/2013  Hashimoto et al.
(Continued)

FOREIGN PATENT DOCUMENTS

JP     2010-154957 A    7/2010
JP     2011-062378 A    3/2011
(Continued)

OTHER PUBLICATIONS

Office Action issued in Japanese Patent Application No. 2023-563886, dated Jun. 11, 2024, along with an English translation thereof.
(Continued)

*Primary Examiner* — William Choi
(74) *Attorney, Agent, or Firm* — Greenblum & Bernstein, P.L.C.

(57) ABSTRACT

An imaging system includes a first image pickup and a second image pickup, a first imaging device imaging a first scene onto the first image pickup, a second imaging device imaging a second scene onto the second image pickup; wherein the first imaging device includes a front optical unit including a front lens, a beam splitter, and a first rear optical unit, wherein the second imaging device includes the front optical unit, the beam splitter, a second rear optical unit, a focus point of one of the imaging devices is a macro focus point, a focus point of the other imaging device is a wide-angle focus point, the macro focus point is within a range from 0 mm to 1 mm in front of the front lens and the wide-angle focus point is at least 3 mm in front of the front lens.

16 Claims, 6 Drawing Sheets

(58) Field of Classification Search
USPC .......................................................... 359/629
See application file for complete search history.

(56) References Cited

U.S. PATENT DOCUMENTS

2016/0291332 A1   10/2016   Moore
2019/0219831 A1    7/2019   Duckett et al.

FOREIGN PATENT DOCUMENTS

JP       2015-039617   A    3/2015
WO     WO2013/031701  A1    3/2013
WO      2016/154750   A1   10/2016

OTHER PUBLICATIONS

International Search Report issued in WIPO Patent Application No. PCT/IB2022/053891, dated Jun. 30, 2022, along with an English translation thereof.
Office Action issued in family member European application No. 22721879.9 dated Sep. 26, 2025.

MULTI-SENSOR SYSTEM HAVING AN OPTICAL BEAM SPLITTER

The present invention relates to a multi-sensor system having an optical beam splitter. The multi-sensor system is preferably used in an endoscope, and in particular in an endoscope for insertion into a hollow space of a human body. However, the use is not limited to an endoscope, even if the further description relates primarily to use in an endoscope.

STATE OF THE ART

Endoscopes comprising fixed optics and comprising zoom objectives are known. In said endoscopes, the image of the scene in the object space is picked up by a single image sensor.

SUMMARY OF THE INVENTION

An objective of an endoscope includes two or more image sensors (image pickup means). Each of the image sensors picks up an image which is formed of a respective scene on the image sensor by a respective imaging device. The imaging devices have a common front optical unit and a common beam splitter. Respective rear optical units follow behind the beam splitter. At least the front optical unit has a non-zero optical refractive power. Moreover, at least one of the rear optical units has a non-zero refractive power, but also several of the rear optical units or all rear optical units may have a non-zero refractive power. In this way, different images are picked up on the image sensors. The light flux may be split in a non-dichroic manner. The combinations of the imaging device and the respective image sensor are then different as to their focus points. One of the imaging devices ("macro") has its focus point on or directly in front of the foremost lens (max. 1 mm in front of the vertex of the foremost lens on the object side), while another of the imaging devices ("wide angle") has its focus point further away (3 mm or more in front of the vertex, preferably in the range from 3 mm to 12 mm in front of the vertex). In addition, the imaging devices may be different by: their focal widths (i.e., a distance of the focus point of the respective imaging device from a front focal point of the respective imaging device), their focal lengths, their maximum viewing angles, their diaphragm apertures, their average transmittance in RGB wavelength ranges of the visible light and/or an average sensitivity of their image sensors in RGB wavelength ranges of the visible light. Here the RGB wavelength ranges are defined as 650 nm±5 nm, 532 nm±5 nm and 460 nm±5 nm, respectively. For example, the rear optical units may have different values for at least one of said parameters and/or the image sensors have different average sensitivities in the relevant wavelength range.

The imaging on the image sensors is performed without an intermediate imaging, in particular without an intermediate imaging on the beam splitter. This helps avoid accumulation of imaging errors.

As the front optical unit is identical for the imaging devices, the image sensors pick up particular scenes which at least partially overlap or are even identical, when viewed from the front optical unit. On the other hand, the images on the image sensors are different, because at least the focus points are different. If the images of at least two of the image sensors are combined, a higher depth of field can be achieved than this is possible by a single image. It is another option that the imaging devices permit different magnifications. For example, a multi-stage (e.g., two-stage) zoom can be formed by switching between the image sensors. In particular, for this type of zoom no movable part is required in the imaging system.

The combination of different focus points having different focal lengths is of particular advantage so that different magnifications are resulting for the image formations by the two imaging devices when the same scene is in the focus point of the respective imaging device. In this case, the magnification is defined as the ratio of the imaging size to the object size. This can be utilized in an endoscopic examination, for example, as follows:

The physician can initially examine the area to be examined by a sensor whose focus point is relatively distant (e.g., more than or equal to 3 mm) from a larger distance with a common magnification. If he/she intends to examine a detail in the observed scene more accurately, he/she can move the endoscope more closely to the tissue or even place it onto the tissue. Then he/she makes use of a different image sensor whose imaging device has a closer focus point and a larger magnification. In this way, the physician can accurately examine the site in question. When the physician places the endoscope onto the site to be examined, the latter is illuminated by scattered light from the illumination device of the endoscope that passes through the tissue to the examined.

Conventionally, the physician should use an endoscope comprising zoom optics and an adjustable focus point for such an examination. Such endoscope is relatively expensive and difficult to handle. In contrast to this, in an endoscope comprising an imaging system according to the invention, the physician merely has to switch between the two image sensors.

Further, for example the product of a transmittance of the respective imaging device with the sensitivity of the corresponding image sensor may be different for the two imaging devices, for example by 50%, preferably by 100%, or even by 400% of the lower one of the two sensitivities. In this way, a wide dynamic range can be covered for the imaging. Concretely, for example the transmittance of the imaging devices can be different. This can be achieved, for example, by the fact that the beam splitter does not symmetrically split the light flux, and/or by the fact that differently large diaphragms are used in the two rear optical units. In this way, the dynamic range of the imaging is increased. But also (instead or additionally) the sensitivity of the image sensors can be different. In such configuration, for example the two rear optical units may have no optical refractive power. The sensitivity describes the number of the generated charges per photon impinging on the image sensor.

Several of the effects that can be achieved by the invention are summarized once again in the following listing. It has to be observed that this listing is not exhaustive and that not all those effects need to be achieved for each embodiment:

(A) Multi-focus system

A combination of the single images achieves an increase in the depth of field without any movable components.

Usually, the distance of the sensor from the objective is varied (as an alternative, there are also solutions which dynamically vary the objective properties, such as distances of the lenses or the lens shape). It is a drawback of the previous solutions that only one particular focus point at a time can be set. The simultaneous pickup of several images having different focus points permits an artifact-free generation of a very high depth of field at a potentially very low diaphragm stage (which increases the resolution over the total image and, possibly, promotes the sensitivity of the camera system).

(B) Optical multi-zoom (multi-magnification)

Usually, multi-zoom systems are attained by dynamic modification of the distances of the lens groups. As a rule, this can be realized only by means of high technical expenditure and is often susceptible to interference. A non-movable system potentially is less susceptible to interference and can be adjusted more finely. Moreover, fixed zoom stages can be easily switched.

(C) HDR (high dynamic range) imaging

Usually, for the formation of HDR images by LDR (low dynamic range) sensors (light-dependent resistance) several images of different exposure stages (illumination intensities) are picked up. As an alternative, there exist systems which, within the same image, utilize pixels of different exposure at the expense of the resolution. In the suggested system, with a constant resolution an HDR image is generated by means of plural LDR sensors in an artifact-free manner (without any time shift of objects in moving scenes).

In several embodiments of the invention, two imaging devices comprising appropriate image sensors are used. In several embodiments of the invention, even more than two imaging devices comprising appropriate image sensors can be used. For example, the light flux can be split several times by plural beam splitters connected in series.

DETAILED DESCRIPTION OF EMBODIMENTS

In the following, details of an imaging system of this type shall be described.

Figure 1:
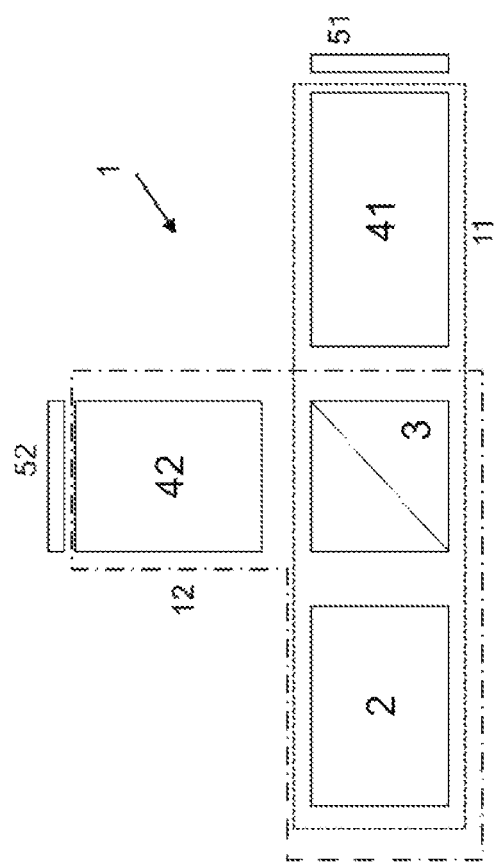
FIG. 1 schematically shows an imaging system according to an embodiment of the invention.

FIG. 1 schematically shows an imaging system 1 according to several embodiments of the invention. The imaging system 1 includes two imaging devices 11 and 12 imaging a respective scene in the object space onto respective image sensors (image pick-up means) 51 and 52. The imaging device 11 consists of the front optical unit 2, the beam splitter 3 and the rear optical unit 41. The imaging device 12 consists of the same front optical unit 2, the same beam splitter 3 and the rear optical unit 42 that is different from the rear optical unit 41.

The image sensors 51, 52 may be semiconductor sensors, such as a CMOS chip or a CCD chip. The image sensors 51, 52 have a sensitivity in the visible wavelength range, in particular in the three wavelength ranges 650 nm±5 nm (red), 532 nm±5 nm (green) and 460 nm±5 nm (blue) (hereinafter also referred to RGB wavelength ranges). For example, for each of the image sensors 51, 52 in at least one of the RGB wavelength ranges for each wavelength the sensitivity may be higher than 50% of a maximum sensitivity of the respective image sensor. Preferably, the sensitivity in the at least one RGB wavelength range is higher than 60% of the maximum sensitivity of the respective image sensor. That is, in the at least one RGB wavelength range, both image pickup means have a sufficient sensitivity for image detection of adequate quality. More preferred, the sensitivity in the at least one wavelength range is higher than 70% or even higher than 80%. In several embodiments, the two image sensors 51 and 52 have the same sensitivity over the at least one RGB wavelength range. Preferably, the properties described here for at least one of the RGB wavelength ranges are applicable to all three RGB wavelength ranges.

In several embodiments, at least one of the rear optical units 41, 42 deflects the respective light flux (e.g., by one or more mirrors, also using a relay optics, where necessary) so that the image planes of the two imaging devices 11, 12 are located in one plane. Then, one single image sensor can be used instead of two separate image sensors, wherein different regions of the single image sensor correspond to the two image pickup means 51, 52.

In several embodiments, the whole imaging system 1 in the RGB wavelength ranges is non-dichroic. Preferably, the whole imaging system is non-dichroic over the whole visible spectrum (405 nm to 700 nm) and possibly even beyond the same, e.g., up to 380 nm and up to 900 nm (or 800 nm or 850 nm), respectively. In particular, also the beam splitter 3 may be non-dichroic in the respective wavelength range. For the purposes of this application, the term "non-dichroic" means that, for each pair of a first wavelength of one of the RGB wavelength ranges and of a second wavelength of another of the RGB wavelength ranges, a ratio of a product of a transmittance of the first imaging device 11 for the first wavelength and a sensitivity of the first image pickup means 51 for the first wavelength to a product of a transmittance of the second imaging device 12 for the first wavelength and a sensitivity of the second image pickup means 52 for the first wavelength differs by not more than 50% from a ratio of a product of a transmittance of the first imaging device 11 for the second wavelength and a sensitivity of the first image pickup means 51 for the second wavelength to a product of a transmittance of the second imaging device 12 for the second wavelength and a sensitivity of the second image pickup means 52 for the second wavelength. Preferably, these ratios differ even by less than 25% and, more preferred, the ratios for each pair of two wavelengths from the relevant wavelength range are equal. The reference value for the foregoing percentages is the smaller of the two ratios, unless the two ratios are equal.

The front optical unit 2 is common to the two imaging devices 11, 12. It has a non-zero refractive power. It has a front lens that is closest to the object space. Further, it can determine a cross-sectional surface of the light flux from the scene. That is, it can have a diaphragm function. In this way, for example the maximum possible viewing angle (FOV) is determined by the front optical unit 2.

Figure 6:
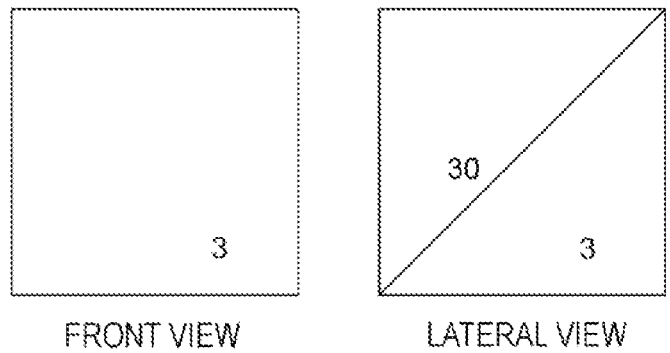
FIG. 6 shows a front view and a lateral view of a beam splitter that is used in several imaging systems according to embodiments of the invention.

FIG. 6 shows an example of a beam splitter 3. The beam splitter 3 splits the intensity of the light flux and directs it to different directions toward the rear optical units 41 and 42, respectively. The beam splitter 3 may be non-dichroic. The beam splitter 3 may be, for example, a semi-permeable mirror or a beam splitter cube that splits the incident light flux at an interface 30 according to the principle of frustrated total reflection. The beam splitter 3 can split the intensity of the light flux equally in both directions, or it can direct in the one direction a higher intensity than in the other direction.

Figure 7:
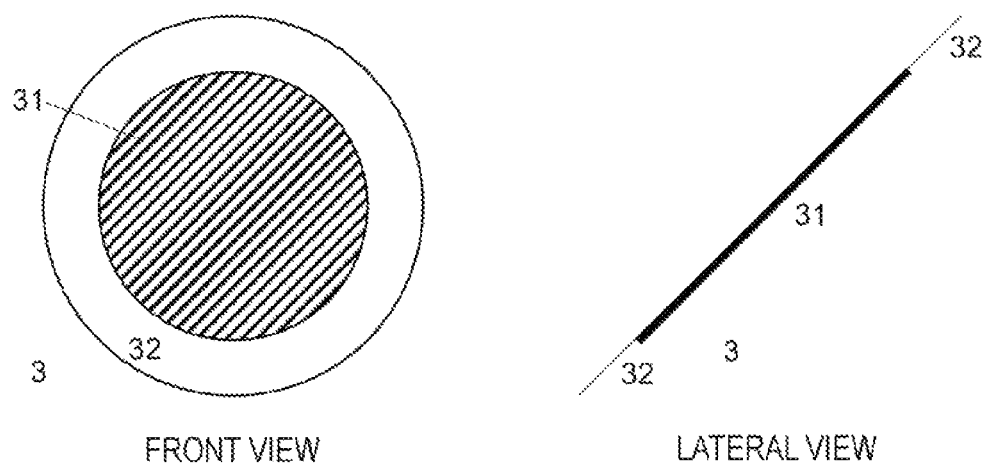
FIG. 7 shows a front view of a beam splitter that is used in several imaging systems according to embodiments of the invention.

Another possible beam splitter 3 is illustrated in FIG. 7. Said beam splitter 3 splits the light flux geometrically. In this example, a mirror 31 (e.g., a round mirror) is arranged centrally (preferably symmetrically) in the light flux. The mirror is tilted about an angle (in a range of, e.g., 45°±30°) vis-à-vis the optical axis of the front optical unit 2 so as to direct light into the second rear optical unit 42. The mirror has at least in the RGB wavelength ranges (preferably in the whole visible spectrum and possibly beyond that, as described above) a reflectance that is higher than 50%, preferably higher than 75%, even more preferred higher than 95%. The reflectance may be 100%. The mirror may at the same time be the diaphragm of the imaging device 12.

Only a part of the light flux from the front optical unit 2 is incident on the mirror 31. The region 32 of the beam splitter 3 on which the other part of the light flux is incident is substantially transparent. For example, it may be a glass to which the reflecting layer 31 of the mirror is applied. Therefore, said beam splitter acts as an annular diaphragm for the imaging device 11. The transmittance of the region 32 in the RGB wavelength ranges (preferably in the whole visible spectrum and possibly even beyond that, as described above) is higher than 50%, preferably higher than 75%, even more preferred higher than 95%. The transmittance may be 100%.

The shape of the mirror 31 is not restricted. It may be round (e.g., circular or elliptical), for example. The mirror may also take the shape of a polygon (triangle, square, . . . ) however.

In the example shown in FIG. 7, the central surface 31 is reflecting and the peripheral surface 32 is transparent. However, in several embodiments alternatively the central surface may be transparent and the peripheral surface may be reflecting.

The reflectance and transmittance, respectively, may also have a gradient: High reflectance (or transmittance) in the center of the light flux (e.g., >90%, or even 100%) and continuously decreasing to the outside so that low reflectance (or transmittance) is attained at the edge (e.g., <10%, or even 0%).

If the beam splitter 3 is dichroic, in several embodiments in at least one of the two imaging devices 41, 42, a component (e.g., a color filter) can be arranged that compensates the dichroism of the beam splitter 3 so that the whole imaging system 1 is non-dichroic. The beam splitter 3 may be dependent on polarization or independent of polarization.

The rear optical units 41, 42 are located in the propagation direction of the light from the front optical unit 2 to the image sensors 51, 52 behind the beam splitter 3. In several embodiments, they have a non-zero refractive power, or else one of the rear optical units 41, 42 has a zero refractive power and the other of the rear optical units 41, 42 has a non-zero refractive power. They include the effective diaphragm of the respective imaging device 41, 42, unless the beam splitter 3 or the front optical unit 2 constitutes the effective diaphragm of at least one of the imaging devices 41, 42. They can include lenses and/or (curved) mirrors.

The focus point of one of the imaging devices lies in the range from 0 to 1 mm in front of the object-side vertex of the front lens ("macro focus point"), whereas the focus point of the other imaging device lies in the range from 3 mm to 12 mm in front of the object-side vertex of the front lens ("wide-angle focus point"). The focus point designates the intersection of the optical axis of the respective imaging device 11, 12 with the object surface (e.g., object plane) which is sharply imaged on the respective image sensor 51, 52. For the imaging means having the macro focus point, the distance from the focus point to the entrance pupil, measured in the optical axis, is larger than the focal width of the imaging means, for example in the range of 2 to 4 times the focal width. The focus plane is perpendicular to the optical axis and may be flat or convex. In the event of a convex focus plane, the radius of curvature should not be smaller than the radius of curvature of the front lens.

Apart from the case that the beam splitter 3 splits the intensity of the light fluxes differently and, thus, causes different transmittance of the two imaging devices 11, 12, and from the case that the sensitivity of the image sensors is different, the two rear optical units 41, 42 are in charge of the fact that the two imaging devices 11, 12 may differ by at least one optical parameter (in addition to the position of the focus points). Of course, also the splitting of the intensity of the light flux by the beam splitter 3 may be asymmetric and the two rear optical units 41, 42 may additionally differ by at least one optical parameter.

The optical parameter can be, for example, a focus width (i.e., a distance of the focus point of the respective imaging device from a front focal point) of the respective imaging device, a focal length of the respective imaging device 11, 12, a maximum viewing angle of the respective imaging device 11, 12, a diaphragm aperture of the respective imaging device 11, 12, and/or an average transmittance of the respective imaging device 11, 12 in the RGB wavelength ranges (or in the whole visible spectrum and even beyond that, as described above).

In the following, preferred minimum values for the respective difference will be stated:

When the optical parameter is the distance of the focus point from the front focal point, a distance of the focus point of one of the first imaging device and the second imaging device from the front focal point of the one of the first imaging device and the second imaging device is different by at least 25% from a distance of the focus point of the other of the first imaging device and the second imaging device from the front focal point of the other of the first imaging device and the second imaging device;

When the optical parameter is the focal length, the focal length of the first imaging device 11 is different by at least 10% from the focal length of the second imaging device 12; even more preferred, the difference is at least 30% or even at least 50%.

When the optical parameter is the maximum viewing angle, the maximum viewing angle of the first imaging device 11 is different by at least 20% from the maximum viewing angle of the second imaging device 12; even more preferred, the difference is at least 35% or even 50%.

When the optical parameter is the diaphragm aperture, a surface of the diaphragm aperture of the first imaging device 11 is different by at least 25% from a surface of the diaphragm aperture of the second imaging device 12; even more preferred, the difference is at least 50% or at least 75% or even at least 100%.

When the optical parameter is the transmittance, the average transmittance of the first imaging device 11 in at least one of the RGB wavelength ranges (preferably in all three RGB wavelength ranges or in the whole visible spectrum) is different by at least 50% from the average transmittance of the second imaging device 12 in the respective wavelength range; even more preferred, the difference is at least 100% or even at least 400%.

When the average sensitivity of the first image pickup means 51 in at least one of the RGB wavelength ranges (preferably in all three RBG wavelength ranges or in the whole visible spectrum) is different from the average sensitivity of the second image pickup means 52 in the respective wavelength range, the average sensitivity of the first image pickup means 51 is different by at least 25% from the average sensitivity of the second image pickup means 52; even more preferred, the difference is at least 50%, at least 100% or even at least 400%.

The average of each of the transmittance, the sensitivity, and the product of transmittance and sensitivity, respectively, is formed over the respective wavelength range. The reference value for each of the foregoing percentages is the smaller value of the corresponding values for the first and second imaging devices and the associated image sensors, respectively.

The properties previously described for the RBG wavelength ranges 650 nm±5 nm (red), 532 nm±5 nm (green) and 460 nm±5 nm (blue) are preferably applicable also in one or both wavelength ranges of 465 nm to 527 nm and 537 nm to 645 nm therebetween. Furthermore, they are also applicable preferably in at least one of the upward and downward adjacent wavelength ranges of 380 nm to 455 nm and 655 nm to 900 nm which also comprise UV or infrared light. These ranges can also be limited by a lower wavelength of 405 nm and an upper wavelength of 850 nm or 800 nm or 700 nm, respectively.

Figure 2:
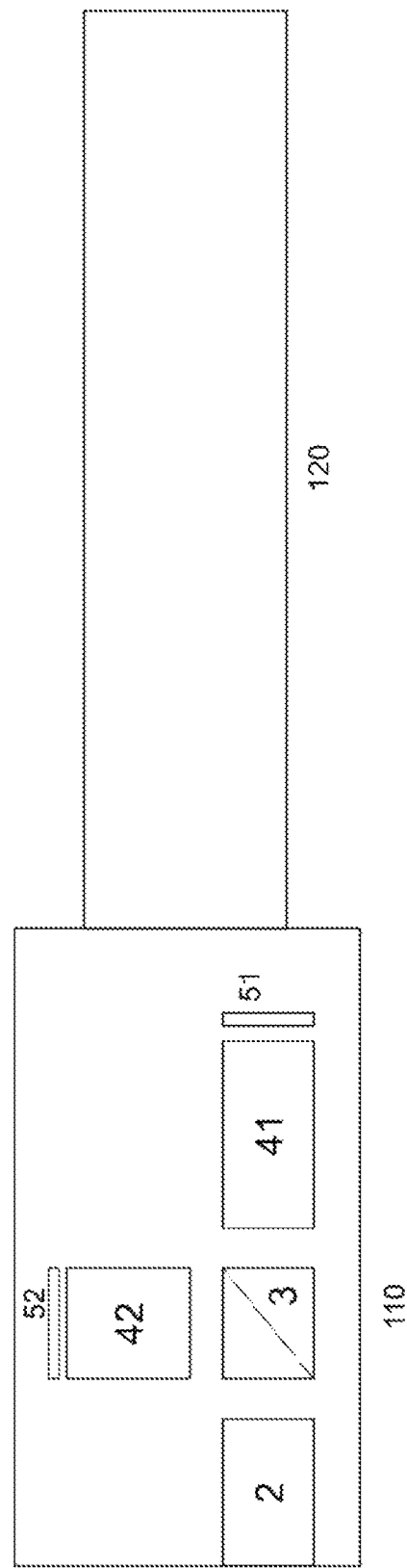
FIG. 2 schematically shows an endoscope comprising an imaging system according to an embodiment of the invention.

FIG. 2 illustrates an example in which the imaging system 1 according to several embodiments of the invention is accommodated in an endoscope tip 110. The endoscope tip can be suitable for being inserted into a cavity (such as a cavity of a human body). Accordingly, the front optical unit 2 is closer to a distal end of the endoscope tip 110 than the two rear optical units 41, 42. In the example shown in FIG. 2, the endoscope tip 110 is connected to an insertion shaft 120 of an endoscope. However, the endoscope tip 110 according to several embodiments of the invention can be used alone without an insertion shaft (so-called capsule endoscopy). The insertion shaft 120 can be either a rigid insertion shaft (a pipe or tube) or a flexible tube. Between the endoscope tip 110 and the insertion shaft 120, an angulation segment may be provided so that the endoscope tip 110 is connected only indirectly to the insertion shaft 120 (not shown).

When the imaging system 1 is accommodated in the endoscope tip 110 such that the first imaging device 11 extends in parallel to the axis of the endoscope tip, while the second imaging device 12 is bent relative thereto, as shown in FIG. 2, the first imaging device 11 preferably has a relatively large focal length and the second imaging device 12 preferably has a relatively small focal length.

Figure 3:
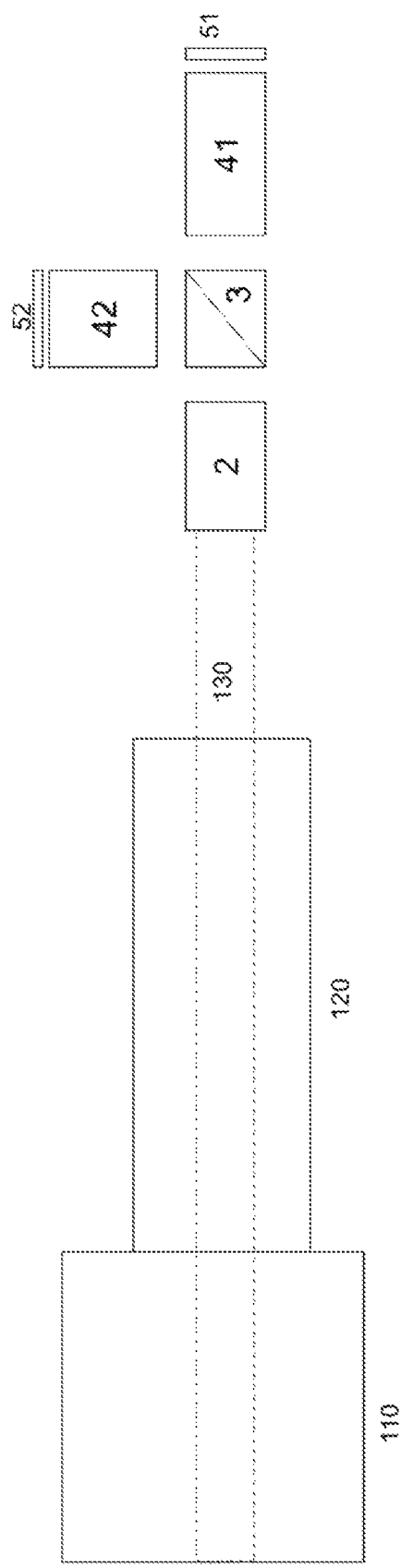
FIG. 3 schematically shows an endoscope system comprising an imaging system according to an embodiment of the invention.

While, in FIG. 2, the whole imaging system 1 is located inside the endoscope tip 110, a part of the imaging system 1 can also be located outside the endoscope tip 110. In this case, a relay optics transmits the light flux between the parts of the imaging system 1 located inside the endoscope tip 110 and the parts of the imaging system 1 located outside thereof. In particular, also the whole imaging system 1 may be located outside the endoscope tip 110. As illustrated in FIG. 3, in this case the relay optics 130 transmits the light flux from the object space to the front optical unit 2 outside the endoscope tip 110. As relay optics 130, e.g., glass fibers or a rod optics, such as a Hopkins optics, are considered. Even if it is schematically shown in FIG. 3, the endoscope tip 110, the insertion shaft 120 and the imaging system 1 can be, but need not be, in line.

Figure 4:
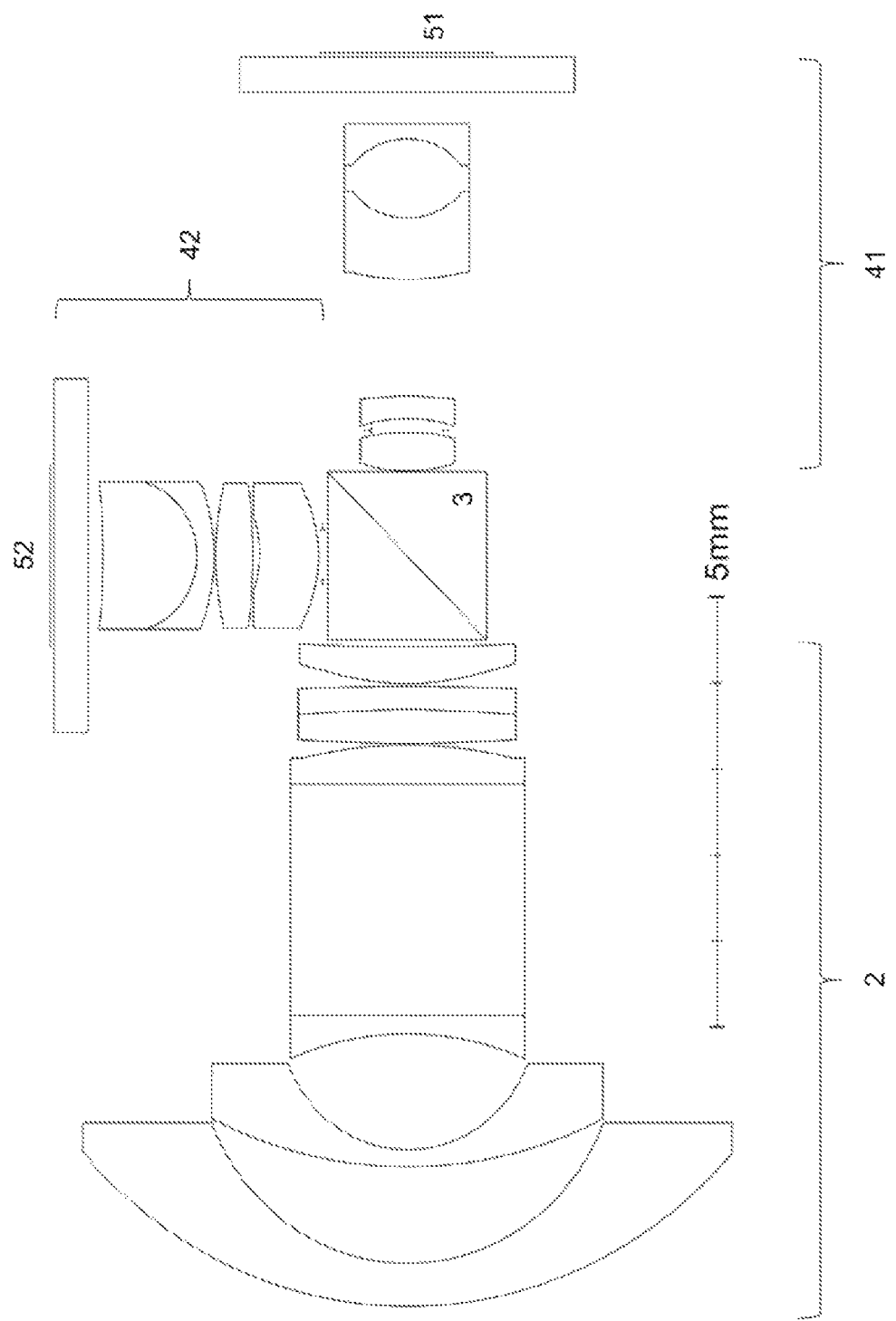
FIG. 4 shows a section across an imaging system according to a first embodiment of the invention.
Figure 5:
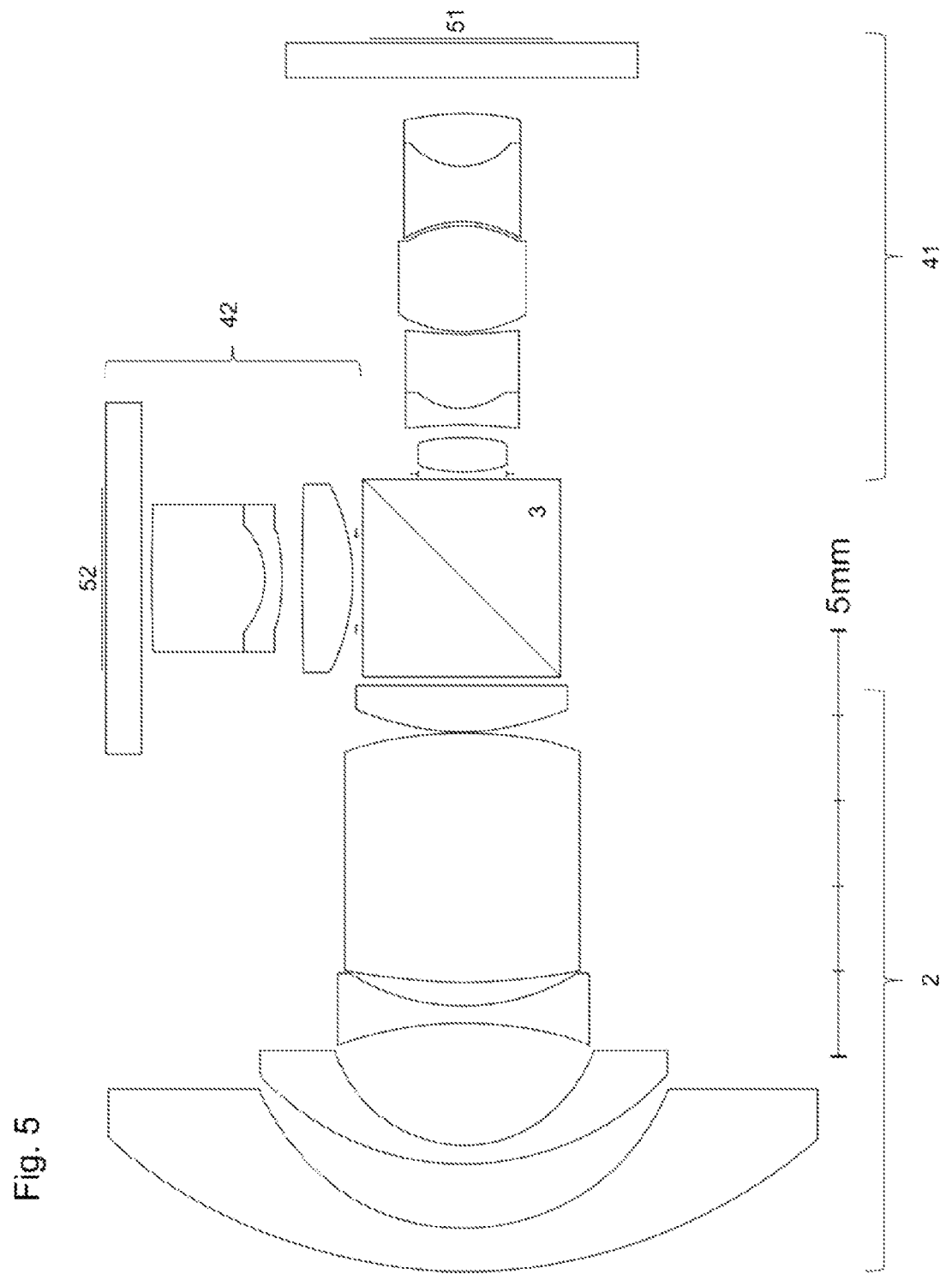
FIG. 5 shows a section across an imaging system according to a second embodiment of the invention.

FIGS. 4 and 5 show in detail first and second embodiments of imaging systems 1 according to the present invention. The parameters of the individual lenses, diaphragms and beam splitters are stated in the Tables 1 and 2 (for FIG. 4) and the Tables 4 and 5 (for FIG. 5). The optical characteristics of the systems are given in the Tables 3 (for FIG. 4) and 6 (for FIG. 5). The values of length in the tables 1 to 6 are stated in mm. Except for the beam splitter 3, the optical components of the two imaging systems 1 in FIGS. 4 and 5 have a circular cross-section in the propagation direction of the light. FIG. 6 illustrates for the two imaging devices the front view and the lateral view of the beam splitter 3. The latter is cube-shaped (i.e., square in cross-section) and, in the lateral view, the partial reflection surface of the beam splitter is located in the diagonal line.

Table 7 indicates the refractive indices nd and Abbe coefficients vd of the types of glass used. The refractive indices are indicated for a wavelength of 587.6 nm. The Abbe coefficient is defined as $vd=(nd-1)/(n_F-n_C)$, wherein nd, $n_F$ and $n_C$ are the refractive indices of the material for the wavelengths of the Fraunhofer d, F and C spectral lines (587.6 nm, 486.1 nm and 656.3 nm, respectively).

The refractive elements in the imaging device 1 are not restricted to spherical lenses. The lenses may also be non-spherical. Reflecting refractive elements, such as curved mirrors, can also be used. The lenses or mirrors can be made, e.g., from glass or plastic. The lenses or mirrors can be coated. When the imaging device or at least the front optical unit of the imaging device is accommodated in an endoscope tip, it is desirable that at least the foremost element (e.g., lens) of the front optical unit has sufficient scratch and shock resistance and resistance to the ambient medium.

TABLE 1

Parameters of the first imaging device of the first embodiment
(large focal length, non-reflected beam at the beam splitter)

| Surface | Type | Radius | Thickness | Glass | Inside width | |
|---|---|---|---|---|---|---|
| OBJ | STANDARD | infinite | 0.1 | | 0 | |
| 1 | STANDARD | 5.32688 | 0.5 | N-LASF31A | 7.928541 | common |
| 2 | STANDARD | 2.571913 | 1.111902 | | 4.766729 | " |
| 3 | STANDARD | 5.51292 | 0.1991503 | LASF35 | 4.766729 | " |
| 4 | STANDARD | 1.566709 | 1.338988 | | 2.908025 | " |

TABLE 1-continued

Parameters of the first imaging device of the first embodiment
(large focal length, non-reflected beam at the beam splitter)

| Surface | Type | Radius | Thickness | Glass | Inside width | |
|---|---|---|---|---|---|---|
| 5 | STANDARD | −3.459058 | 0.1998291 | S-LAH58 | 2.849251 | " |
| 6 | STANDARD | infinite | 2.689408 | S-NBH56 | 2.819216 | " |
| 7 | STANDARD | infinite | 0.442325 | S-LAH60MQ | 2.657098 | " |
| 8 | STANDARD | −6.179519 | 0.01960087 | | 2.657098 | " |
| 9 | STANDARD | 19.04449 | 0.4093794 | S-NBH56 | 2.657098 | " |
| 10 | STANDARD | −11.07118 | 0.2719547 | S-PHM52 | 2.657098 | " |
| 11 | STANDARD | −16.98014 | 0.01963971 | | 2.657098 | " |
| 12 | STANDARD | 3.634066 | 0.4344662 | N-SK5 | 2.657098 | " |
| 13 | STANDARD | 21.89326 | 0.07569983 | | 2.657098 | " |
| 14 | BSP | infinite | 1.94241 | S-BSM10 | 1.942 | beam splitter |
| 15 | STANDARD | infinite | 0.01988932 | | 1.942 | |
| 16 | STANDARD | 2.262227 | 0.4452589 | N-FK58 | 1.146625 | |
| 17 | STANDARD | −2.315098 | 0.02004263 | | 1.146625 | |
| STO | STANDARD | infinite | 0.1316034 | | 0.8811368 | |
| 19 | STANDARD | −2.021377 | 0.2553084 | S-NPH3 | 1.146625 | |
| 20 | STANDARD | −4.417204 | 1.364381 | | 1.146625 | |
| 21 | STANDARD | 2.913208 | 0.7151315 | N-LASF31A | 1.354371 | |
| 22 | STANDARD | 0.9048365 | 0.8971804 | L-TIM28P | 1.354371 | |
| 23 | STANDARD | −0.8934974 | 0.2000076 | LASF35 | 1.325018 | |
| 24 | STANDARD | −26.65767 | 0.3583 | | 1.534263 | |
| 26 | STANDARD | infinite | 0.4 | N-ZK7 | 4.08 | |
| 27 | STANDARD | infinite | 0.04 | | 4.08 | |
| IMA | STANDARD | infinite | | | 2.11439 | |

TABLE 2

Parameters of the second imaging device of the first embodiment
(short focal length, reflected beam at the beam splitter)

| Surface | Type | Radius | Thickness | Glass | Inside width | |
|---|---|---|---|---|---|---|
| OBJ | STANDARD | 13 | 8 | | 0 | |
| 1 | STANDARD | 5.32688 | 0.5 | N-LASF31A | 7.928541 | common |
| 2 | STANDARD | 2.571913 | 1.111902 | | 4.766729 | " |
| 3 | STANDARD | 5.51292 | 0.1991503 | LASF35 | 4.766729 | " |
| 4 | STANDARD | 1.566709 | 1.338988 | | 2.908025 | " |
| 5 | STANDARD | −3.459058 | 0.1998291 | S-LAH58 | 2.849251 | " |
| 6 | STANDARD | infinite | 2.689408 | S-NBH56 | 2.819216 | " |
| 7 | STANDARD | infinite | 0.442325 | S-LAH60MQ | 2.657098 | " |
| 8 | STANDARD | −6.179519 | 0.01960087 | | 2.638852 | " |
| 9 | STANDARD | 19.04449 | 0.4093794 | S-NBH56 | 2.536556 | " |
| 10 | STANDARD | −11.07118 | 0.2719547 | S-PHM52 | 2.437903 | " |
| 11 | STANDARD | −16.98014 | 0.01963971 | | 2.31435 | " |
| 12 | STANDARD | 3.634066 | 0.4344662 | N-SK5 | 2.138786 | " |
| 13 | STANDARD | 21.89326 | 0.07569983 | | 2.138786 | " |
| 14 | BSP | infinite | 1.94241 | S-BSM10 | 1.8582 | beam splitter |
| 15 | STANDARD | infinite | 0.04830404 | | 0.5535957 | |
| STO | STANDARD | infinite | 0.01950792 | | 0.4954666 | |
| 17 | STANDARD | 1.653597 | 0.7349678 | BSM51Y | 1.684 | |
| 18 | STANDARD | 1.603825 | 0.05552433 | | 0.8825938 | |
| 19 | STANDARD | 4.746875 | 0.4706623 | N-SK16 | 1.684 | |
| 20 | STANDARD | −3.760073 | 0.01956402 | | 1.684 | |
| 21 | STANDARD | 2.57726 | 0.199657 | S-NPH3 | 1.684 | |
| 22 | STANDARD | 0.8924007 | 1.150727 | N-LAF21 | 1.684 | |
| 23 | STANDARD | 13.36155 | 0.25931 | | 1.684415 | |
| 24 | STANDARD | infinite | 0.4 | N-ZK7 | 4.08 | |
| 25 | STANDARD | infinite | 0.04 | | 4.08 | |
| IMA | STANDARD | infinite | | | 2.143175 | |

TABLE 3

Optical parameters of the first embodiment

First imaging device: large focal length (microscope)

| System aperture F/# = | 4 |
|---|---|
| Effective focal length: | 0.8670161 |
| Total length: | 14.50188 |

Second imaging device: small focal length (wide-angle objective)

| System aperture F/# = | 4 |
|---|---|
| Effective focal length: | 0.5218 |
| Total length: | 13.05297 |

TABLE 4

Parameters of the first imaging device of the second embodiment
(large focal length, non-reflected beam at the beam splitter)

| Surface | Type | Radius | Thickness | Glass | Inside width | |
|---|---|---|---|---|---|---|
| OBJ | STANDARD | 6.394 | 0.01 | | 0 | |
| 1 | STANDARD | 6.293567 | 0.5055 | N-LASF31A | 8.326159 | common |
| 2 | STANDARD | 2.577446 | 0.7545265 | | 4.790271 | " |
| 3 | STANDARD | 3.247763 | 0.22242 | LASF35 | 4.790271 | " |
| 4 | STANDARD | 1.592593 | 1.426588 | | 3.040405 | " |
| 5 | STANDARD | −4.278991 | 0.2022 | S-LAH55VS | 2.94653 | " |
| 6 | STANDARD | 2.505258 | 0.2603647 | | 2.660856 | " |
| 7 | STANDARD | 6.88615 | 2.935283 | N-LASF9HT | 2.664353 | " |
| 8 | STANDARD | −4.129743 | 0.01981412 | | 2.78419 | " |
| 9 | STANDARD | 3.00255 | 0.5509049 | N-SK5 | 2.484355 | " |
| 10 | STANDARD | infinite | 0.07077 | | 2.484355 | " |
| 11 | STANDARD | infinite | 2.312112 | S-LAL58 | 1.75041 | beam splitter |
| 12 | STANDARD | infinite | 0.02 | | 1.010521 | |
| STO | STANDARD | infinite | 0.02 | | 0.9993462 | |
| 14 | STANDARD | 1.707364 | 0.45015 | N-FK51A | 1.034641 | |
| 15 | STANDARD | −3.342526 | 0.1950306 | | 1.041034 | |
| 16 | STANDARD | −4.052224 | 0.2 | S-NBH56 | 1.015583 | |
| 17 | STANDARD | 0.8074477 | 0.8708232 | S-TIL27 | 1.03589 | |
| 18 | STANDARD | 4.846393 | 0.02 | | 1.324238 | |
| 19 | STANDARD | 1.395096 | 1.232633 | S-NPH1 | 1.490698 | |
| 20 | STANDARD | −1.507761 | 0.01963623 | | 1.326197 | |
| 21 | STANDARD | −1.478974 | 0.7041617 | LASF35 | 1.267117 | |
| 22 | STANDARD | 0.8 | 0.5868501 | S-FTM16 | 1.19773 | |
| 23 | STANDARD | −2.780058 | 0.463 | | 1.356103 | |
| 24 | STANDARD | infinite | 0.4 | N-ZK7 | 4.12488 | |
| 27 | STANDARD | infinite | 0.04 | | 4.12488 | |
| IMA | STANDARD | infinite | | | 2.088925 | |

TABLE 5

Parameters of the second imaging device of the second embodiment
(large focal length, reflected beam at the beam splitter)

| Surface | Type | Radius | Thickness | Glass | Inside width | |
|---|---|---|---|---|---|---|
| OBJ | STANDARD | 13 | 8 | | 0 | |
| 1 | STANDARD | 6.293567 | 0.5055 | N-LASF31A | 8.326243 | common |
| 2 | STANDARD | 2.577446 | 0.7545265 | | 4.790296 | " |
| 3 | STANDARD | 3.247763 | 0.22242 | LASF35 | 4.790296 | " |
| 4 | STANDARD | 1.592593 | 1.426588 | | 3.040424 | " |
| 5 | STANDARD | −4.278991 | 0.2022 | S-LAH55VS | 2.946658 | " |
| 6 | STANDARD | 2.505258 | 0.2603647 | | 2.660986 | " |
| 7 | STANDARD | 6.88615 | 2.935283 | N-LASF9HT | 2.664472 | " |
| 8 | STANDARD | −4.129743 | 0.01981412 | | 2.784478 | " |
| 9 | STANDARD | 3.00255 | 0.5509049 | N-SK5 | 2.484614 | " |
| 10 | STANDARD | infinite | 0.07077 | | 2.484614 | " |
| 11 | BSP | infinite | 2.312112 | S-LAL58 | 2.205298 | beam splitter |
| 12 | STANDARD | infinite | 0.02022 | | 0.7184257 | |
| STO | STANDARD | infinite | 0.02022 | | 0.6940511 | |
| 14 | STANDARD | 2.355477 | 0.5917192 | S-BSM16 | 2.205298 | |
| 15 | STANDARD | −25.27571 | 0.2326785 | | 2.205298 | |
| 16 | STANDARD | 2.485541 | 0.2022 | S-NPH3 | 1.224527 | |
| 17 | STANDARD | 0.9095899 | 1.324712 | S-LAL14 | 1.25828 | |
| 18 | STANDARD | −31.37132 | 0.22242 | | 1.723255 | |
| 19 | STANDARD | infinite | 0.01540359 | | 1.894335 | |
| 20 | STANDARD | Infinite | 0.4 | N-ZK7 | 4.12488 | |
| 21 | STANDARD | Infinite | 0.04 | | 4.12488 | |
| IMA | STANDARD | infinite | | | 2.122414 | |

TABLE 6

Optical parameters of the second embodiment

First imaging device: large focal length (microscope)

| | |
|---|---|
| System aperture F/# = | 4 |
| Effective focal length: | 0.9331866 |
| Total length: | 14.48277 |

TABLE 6-continued

Optical parameters of the second embodiment

Second imaging device: small focal length (wide-angle objective)

| | |
|---|---|
| System aperture F/# = | 2.8 |
| Effective focal length : | 0.5462332 |
| Total length: | 12.33006 |

TABLE 7

Refractive indices and Abbe coefficients of the types of glass used

| Glass name | Refractive index nd | Abbe coefficient vd |
|---|---|---|
| BSM51Y | 1.60311 | 60.65 |
| L-TIM28P | 1.69453 | 30.66 |
| N-FK51A | 1.48656 | 84.47 |
| N-FK58 | 1.456 | 90.9 |
| N-LAF21 | 1.788 | 47.49 |
| N-LASF31A | 1.883 | 40.76 |
| N-LASF35 | 2.022 | 29.06 |
| N-LASF9HT | 1.8502 | 32.17 |
| N-SK16 | 1.62041 | 60.32 |
| N-SK5 | 1.58913 | 61.27 |
| N-ZK7 | 1.50847 | 61.19 |
| S-BSM10 | 1.6228 | 57.05 |
| S-BSM16 | 1.62041 | 60.29 |
| S-FTM16 | 1.5927 | 35.31 |
| S-LAH55VS | 1.83481 | 42.74 |
| S-LAH58 | 1.883 | 40.76 |
| S-LAH60MQ | 1.834 | 37.17 |
| S-LAL14 | 1.6968 | 55.5 |
| S-LAL58 | 1.6935 | 50.81 |
| S-NBH56 | 1.85478 | 24.8 |
| S-NPH1 | 1.80809 | 22.76 |
| S-NPH3 | 1.95906 | 17.47 |
| S-PHM52 | 1.618 | 63.4 |
| S-TIL27 | 1.57501 | 41.5 |
| S-TIM28P | 1.69453 | 30.66 |

The invention claimed is:

1. An imaging system comprising
   a first image pickup;
   a second image pickup;
   a first imaging device configured to image a first scene onto the first image pickup in an object space based on a light flux;
   a second imaging device configured to image a second scene onto the second image pickup in the object space based on the light flux; wherein
   the first imaging device from the side of the object space in a propagation direction of the light flux towards the first image pickup consists of:
   a front optical unit having a first non-zero refractive power, including a front lens which is closest to the object space;
   a beam splitter configured to split the light flux and/or an intensity of the light flux into a first light flux and a second light flux, the second light flux propagating in a direction different from the first light flux; and
   a first rear optical unit having a first non-zero refractive power, which is configured such that the first scene is imaged onto the first image pickup via the first light flux without an intermediate image;
   the second imaging device from the side of the object space in a propagation direction of the light flux towards the second image pickup consists of:
   the front optical unit;
   the beam splitter;
   a second rear optical unit configured such that the second scene is imaged onto the second image pickup via the second light flux without an intermediate image;
   a focus point of either the first imaging device or the second imaging device is a macro focus point;
   a focus point of the other of the first imaging device and the second imaging device is a wide-angle focus point; wherein
   the macro focus point is within a range from 0 mm to 1 mm in front of a vertex of the front lens on the side of the object space;
   the wide-angle focus point is 3 mm or more in front of the vertex of the front lens on the side of the object space.

2. The imaging system according to claim 1, wherein the second rear optical unit has a second non-zero refractive power.

3. The imaging system according to claim 1, wherein
   a value of at least one optical parameter of the first imaging device and/or an average sensitivity of the first image pickup are/is different from a value of the at least one optical parameter of the second imaging device and an average sensitivity of the second image pickup, respectively;
   the at least one optical parameter belongs to the group consisting of a focus width of the respective imaging device, a focal length of the respective imaging device, a maximum viewing angle of the respective imaging device, a diaphragm aperture of the respective imaging device and a transmittance of the respective imaging device, wherein
   the focal length of the respective imaging device is a distance of the focus point of the respective imaging device from a front focal point of the respective imaging devices.

4. The imaging system according to claim 3, wherein at least one of the following conditions is met:
   when the optical parameter is the distance of the focus point from the front focal point, a distance of the focus point of one of the first imaging device and the second imaging device from the front focal point of the one of the first imaging device and the second imaging device is different by at least 25% from a distance of the focus point of the other of the first imaging device and the second imaging device from the front focal point of the other of the first imaging device and the second imaging device;
   when the optical parameter is the focal length, the focal length of one of the first imaging device and the second imaging device is different by at least 10% from the focal length of the other of the first imaging device and the second imaging device;
   when the optical parameter is the maximum viewing angle, the maximum viewing angle of one of the first imaging device and the second imaging device is different by at least 20% from the maximum viewing angle of the other of the first imaging device and the second imaging device;
   when the optical parameter is the diaphragm aperture, a surface of the diaphragm aperture of one of the first imaging device and the second imaging device is different by at least 25% from a surface of the diaphragm aperture of the other of the first imaging device and the second imaging device;
   for at least one wavelength range of one of the wavelength ranges 460 nm±5 nm, 532 nm±5 nm, and 650 nm±5 nm: when the optical parameter is the transmittance, an average transmittance of one of the first imaging device and the second imaging device in the respective wavelength range is different by at least 50% from an average transmittance of the other of the first imaging device and the second imaging device in the respective wavelength range;
   for at least one wavelength range of one of the wavelength ranges 460 nm±5 nm, 532 nm±5 nm, and 650 nm±5 nm: when the average sensitivity of one of the first image pickup and the second image pickup in the respective wavelength range is different from the average sensitivity of the other of the first imaging device and the second image pickup in the respective wavelength range, the average sensitivity of the one image pickup is different by at least 25% from the average sensitivity of the other image pickup.

5. The imaging system according to claim 3, wherein the focal lengths of the first and second imaging devices are different from each other.

6. The imaging system according to claim 1, wherein,
for each pair of a first wavelength of a first wavelength range or a second wavelength range or a third wavelength range and a second wavelength of the first wavelength range or the second wavelength range or the third wavelength range, a ratio of a product of a transmittance of the first imaging device for the first wavelength and a sensitivity of the first image pickup for the first wavelength to a product of a transmittance of the second imaging device for the first wavelength and a sensitivity of the second image pickup for the first wavelength differs by not more than 50% from a ratio of a product of a transmittance of the first imaging device for the second wavelength and a sensitivity of the first image pickup for the second wavelength to a product of a transmittance of the second imaging device for the second wavelength and a sensitivity of the second image pickup for the second wavelength,
the first wavelength range is 460 nm±5 nm;
the second wavelength range is 532 nm±5 nm; and
the third wavelength range is 650 nm±5 nm.

7. The imaging system according to claim 6, wherein,
for each wavelength of the first wavelength range and of the second wavelength range and of the third wavelength range, the respective value of the at least one optical parameter of the first imaging device and/or the average sensitivity of the first image pickup is different from the respective value of the at least one optical parameter of the second imaging device and the average sensitivity of the second image pickup, respectively.

8. The imaging system according to claim 7, wherein the parameter is the transmittance and the beam splitter is configured such that, for at least one wavelength range of the first wavelength range, the second wavelength range and the third wavelength range, an average transmittance of the beam splitter in the respective wavelength range for one of the first light flux and the second light flux is higher by at least 25% than an average transmittance of the beam splitter in the respective wavelength range for the other of the first light flux and the second light flux.

9. The imaging system according to claim 6, wherein,
for at least one selected wavelength range selected from a fourth wavelength range, a fifth wavelength range, a sixth wavelength range and a seventh wavelength range, for each pair of a third wavelength of the selected wavelength range and the first wavelength, a ratio of a product of a transmittance of the first imaging device for the first wavelength and a sensitivity of the first image pickup for the first wavelength to a product of a transmittance of the second imaging device for the first wavelength and a sensitivity of the second image pickup for the first wavelength differs by not more than 50% from a ratio of a product of a transmittance of the first imaging device for the third wavelength and a sensitivity of the first image pickup for the third wavelength to a product of a transmittance of the second imaging device for the third wavelength and a sensitivity of the second image pickup for the third wavelength;
the fourth wavelength range is 380 nm to 455 nm;
the fifth wavelength range is 465 nm to 527 nm;
the sixth wavelength range is 537 nm to 645 nm; and
the seventh wavelength range is 655 nm to 900 nm.

10. The imaging system according to claim 9, wherein,
for each wavelength of at least one of the fourth wavelength range, the fifth wavelength range, the sixth wavelength range and the seventh wavelength range, a respective value of the at least one optical parameter of the first imaging device and/or the average sensitivity of the first image pickup are/is different from a respective value of the at least one optical parameter of the second imaging device and the average sensitivity of the second image pickup, respectively.

11. The imaging system according to claim 1, wherein, viewed from the front optical unit, the first scene at least partly overlaps the second scene, the first light flux comes from a first region of the cross-sectional surface of the light flux through the front optical unit, the second light flux comes from a second region of the cross-sectional surface of the light flux through the front optical unit, and the first region is different from the second region.

12. An endoscope tip or capsule endoscope accommodating the imaging system according to claim 1, wherein the front optical unit is closer to a distal end of the endoscope tip than the first rear optical unit and the second rear optical unit.

13. An endoscope device comprising:
the endoscope tip according to claim 12;
an insertion shaft for insertion into a hollow space; wherein
a proximal end of the endoscope tip is directly or indirectly connected to a distal end of the insertion shaft.

14. An endoscope device comprising:
an insertion shaft for insertion into a hollow space;
an endoscope tip for insertion into the hollow space;
the imaging system according to claim 1;
a relay optics; wherein
a proximal end of the endoscope tip is directly or indirectly connected to a distal end of the insertion shaft;
the relay optics is configured to direct the light flux to the front optical unit;
the imaging system is positioned outside the endoscope tip.

15. The endoscope device according to claim 14, wherein at least the first rear optical unit and the second rear optical unit are positioned outside the insertion shaft.

16. An endoscope device comprising:
an insertion shaft for insertion into a hollow space;
an endoscope tip for insertion into the hollow space;
the imaging system according to claim 1;
a relay optics; wherein
a proximal end of the endoscope tip is directly or indirectly connected to a distal end of the insertion shaft;
the front optical unit is located in the endoscope tip;
the relay optics is configured to direct the light flux from the front optical unit to the beam splitter;
the beam splitter, the first rear optical unit and the second rear optical unit are positioned outside the endoscope tip.

* * * * *